United States Patent [19]
Roberson

[11] 3,851,453
[45] Dec. 3, 1974

[54] APPARATUS FOR AND METHOD OF PACKAGING LINEAR MATERIAL

[75] Inventor: Cletis L. Roberson, Newark, Ohio

[73] Assignee: Owens-Corning Fiberglas Corporation, Toledo, Ohio

[22] Filed: May 2, 1973

[21] Appl. No.: 356,537

[52] U.S. Cl. ........................ 57/34 R, 34/24, 57/35, 65/2, 65/3, 65/11 W
[51] Int. Cl..... D01h 13/26, C03b 37/02, F26b 7/00
[58] Field of Search............ 65/11 W, 2, 3; 57/34 R, 57/35, 34 HS; 34/16, 17, 23, 24

[56] References Cited
UNITED STATES PATENTS

| | | | |
|---|---|---|---|
| 2,156,244 | 4/1939 | Mahoney | 57/34 R |
| 2,800,761 | 7/1957 | Owens | 57/35 |
| 3,206,924 | 9/1965 | Mennerich | 57/35 X |
| 3,398,518 | 8/1968 | Nimtz et al. | 57/34 R |
| 3,665,070 | 5/1972 | Knodo | 34/23 X |
| 3,665,694 | 5/1972 | Ford | 57/34 R |

*Primary Examiner*—Robert L. Lindsay, Jr.
*Attorney, Agent, or Firm*—Carl G. Staelin; John W. Overman; Ronald C. Hudgens

[57] ABSTRACT

An apparatus for applying twist to wet glass or other fibers, which comprises a twist frame with a rotable collector having a ring rail with blowers mounted on the ring and directed toward the material collected on the rotable collector for drying the fibers.

3 Claims, 7 Drawing Figures

PATENTED DEC 3 1974 3,851,453
SHEET 1 OF 2
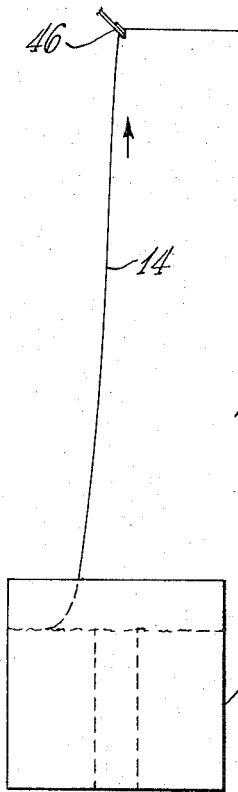
Fig.1
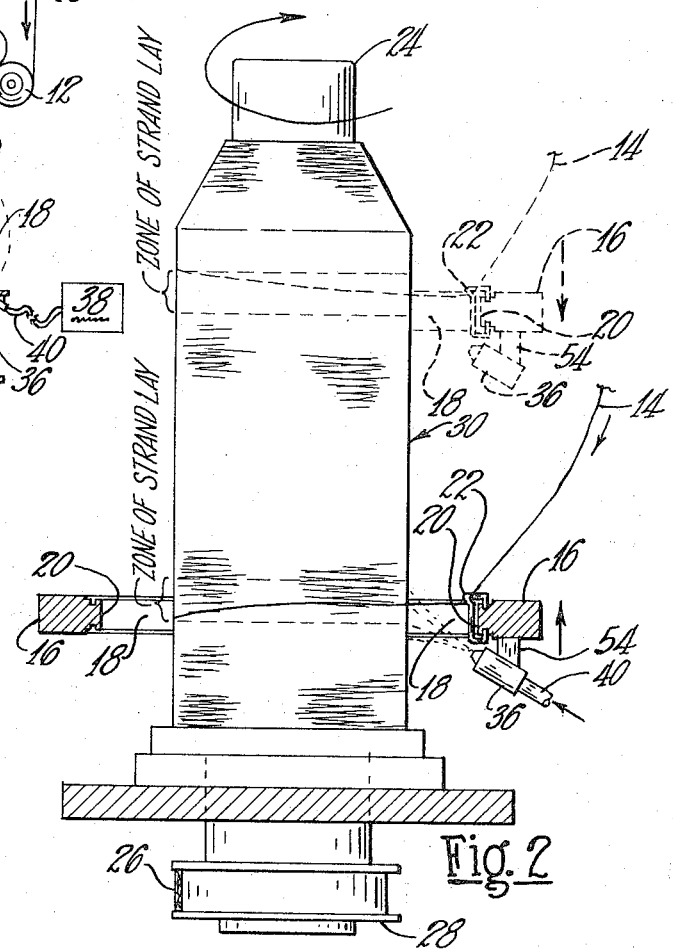
Fig.2
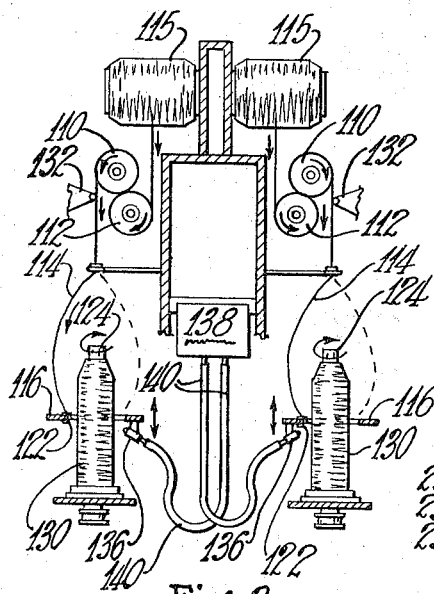
Fig.3
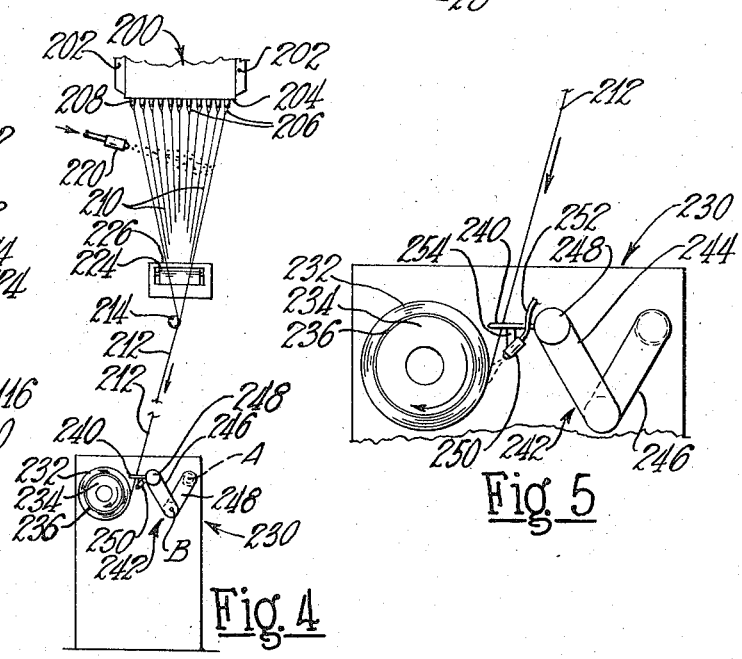
Fig.4
Fig.5

APPARATUS FOR AND METHOD OF PACKAGING LINEAR MATERIAL

BACKGROUND OF THE INVENTION

In the field of textiles it is often necessary to collect moist or wet multifilament continuous linear material into a "wet" wound package. But such practice, while necessary, gives rise to a myriad of difficulties since the linear material must eventually be dried.

For example, it has been the practice to protect glass filaments in glass filament forming operations by applying both water and a liquid sizing or other protective liquid to them before they are combined into a bundle or strand for collection into a wound package of wet glass strand, This practice requires subsequent package drying, and product problems ensuing from such drying. But the very nature of glass filaments demands application of a protective liquid before the filaments are combined into a strand; unprotected glass filaments tend to abrade each other upon contact. So processes forming glass filaments must apply a protective coating to the glass filaments before combining them into a bundle.

Prior practices use bulk drying techniques to dry wet glass strand packages. This conventional drying takes a long time, and causes migration of solids in the sizing or coating to the periphery of the packages. Liquid moves outward to the periphery of the packages for evaporation; such movement tends to move solids to the periphery of the package. So solids tend to concentrate nearer the periphery of the package.

Consequently, strands from packages dried using prior bulk drying techniques have a nonuniform amount of solids along their lengths. And these strands are not fully satisfactory because the properties of the strands are not uniform along their lengths.

Dried packages of glass strand are ready for additional processing. The type of additional processing depends on the end use of strand. Glass strands suitable for textile application commonly pass through twisting and plying operations. Glass strands for use as a reinforcement for materials such as plastics may be combined into a multiple strand roving.

As one can appreciate, conventional package drying operations are cumbersome and not wholly satisfactory. Migration of solids effected during package drying produces a strand that does not have a uniform sizing treatment along its length. Then too, when wet strand collected into a package and subsequently dried, cohesive force of the sizing tends to cohere adjacent strands together. And this tends to cause strand breakage during subsequent processing when strand is withdrawn from the package.

There has been a pressing need for improvement.

SUMMARY OF THE INVENTION

An object of the invention is improved apparatus for and method of processing linear material.

Another object of the invention is apparatus for and method of evaporating liquid from individual layers of linear material wound into a package as the individual layers of such material are formed on the exterior of the package during its formation.

Yet another object of the invention is apparatus for and method of forming a dry wound glass strand package from a wet strand in a glass filament forming position.

Still another object is an improved multifilament textile product.

These and other objects are attained by apparatus comprising means for collecting wet linear material into successive layers and for evaporating liquid from individual layers. The means for evaporating liquid including means for subjecting individual layers to a stream of drying medium and means for effecting relative movement of the stream and the individual layers such that the individual layers are progressively subjected to the stream moved across them.

The above and other objects and advantages will become more apparent as the invention is more fully described hereinafter with reference made to the accompanying drawings.

DESCRIPTION OF THE DRAWINGS

FIG. 1 is a view in elevation of a textile twister embodying the principles of the invention. A nozzle carried by the ring rail of the twister releases a stream of heated air against the circumferential surface of a package during package formation.

FIG. 2 is an enlarged view in elevation of the station portion of the apparatus shown in FIG. 1.

FIG. 3 is a view in elevation of another textile twister embodying the principles of the invention.

FIG. 4 is a side elevation view of a apparatus according to the principles of the invention in a glass filament forming operation.

FIG. 5 is an enlarged side elevation view of the glass strand collection station of the winder shown in FIG. 4.

DESCRIPTION OF THE PREFERRED EMBODIMENTS

Figure 6:
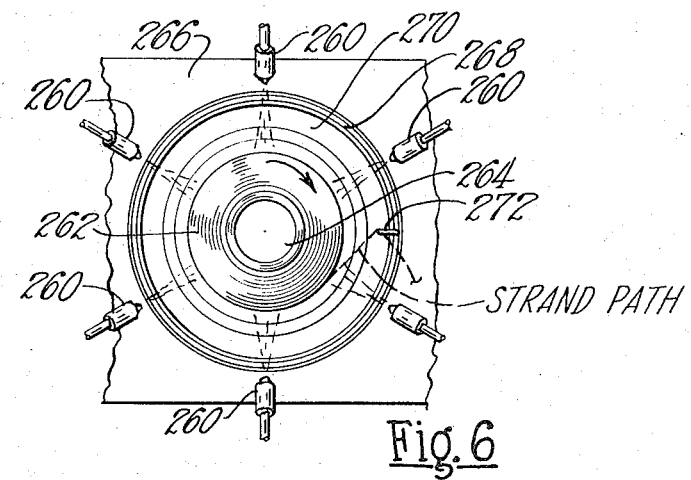
FIG. 6 is a plan view of one position of another textile twister according to the principles of the invention. A plurality of side by side nozzles each release a stream of air against the exterior of a collecting package.

FIGS. 1 and 2 show a textile twister embodying the principles of the invention. The twister advances wet glass strand for collection into successive layers as a wet wound package on a rotating bobbin. The twister includes means for subjecting the layers of the package to a stream of heated gas effective to evaporate liquid from them. In the embodiment the stream is moved progressively in a direction axially of the rotating package. So the stream is able to progressively evaporate liquid from successive strand layers as they are formed during package build.

As shown the twister includes a pair of rotatably driven strand engaging feed rollers 10 and 12 that advance a glass strand 14 from a supply to a twisting station.

The twisting station includes a horizontally disposed ring rail 16 having a circlar opening 18 defined by a circular track portion 20 (see FIG. 2). A traveler or flyer 22 is freely movable along the circular track portion 20 in a conventional manner. Further, the station includes conventional mounting means rotatably holding a bobbin 24 vertically in alignment with the opening 18. As shown the mounting means is rotated (and consequently the bobbin 24) at high speeds by a driven belt 26 that engages a whorl 28.

The bobbin 24 collects the twisted strand 14 (yarn) into successive layers as a longitudinal wound package 30. The diameter of the package 30 increases during package build.

As shown a liquid coating is applied to the advancing strand 14 by an applicator 32 before the twisted strand 14 is collected onto the package 30 at the twisting station. The liquid coating can be either an aqueous or solvent treatment.

The twister vertically reciprocates the horizontal ring rail 16 slowly, in a conventional manner, back and forth along the length of the bobbin 24 ("traverses" the ring rail 16) to distribute the twisted strand 14 onto the package 30 during package formation.

Joined to the underside of the ring rail 16 is a nozzle 36 that directs a high energy stream of heated gas, normally air, against the circumferential surface of the package 30 throughout package formation. Heated air under pressure is supplied to the nozzle 36 from a plenum 38, or other suitable source, through a flexible supply host 40.

The reciprocating movement of the ring rail 16 moves the nozzle 36 up and down lengthwise of the package 30 throughout package formation. So each of the individual layers of the package 30 is progressively subjected to the heated air stream as the nozzle 36 is moved first in one direction axially of the package 30 and then in the other direction axially of the package.

In FIG. 1 the strand 14 is supplied from a body of strand packaged in a open topped tubular container 42. The strand 14 can be packaged in the container 42 in known ways. For example, the packaging method disclosed in U.S. Pat. No. 3,107,441 can be used to provide a strand packaged in a container. The strand in the container 42 can be either wet or dry; however, the strand 14 will normally be wet.

The strand 14 is advanced upwardly from the container 42 to a guide pigtail 46 and then advanced horizontally to another guide pigtail 48 by the strand advancing feed rollers 10 and 12, which are below the guide pigtail 48. So these rollers advance the strand 14 downwardly from the pigtail 48. The strand 14 travels across the applicator 32 to receive the liquid coating (for example a conventional sizing) and then through a guide pigtail 50 aligned with and above the bobbin 24. The wet strand 14 travels through the traveler 22 on the ring rail 16 and collects on the package 30.

As the flyer 16 rotates around the bobbin 24 on the circular track 20 during package build, the traveling strand 14 "balloons" outwardly between the guide pigtail 50 and the traveler 22 as indicated by the dashed lines in FIG. 1.

Twisted strand 14 is collected on the bobbin 24. The amount of twist given to the strand 14 can be controlled in a conventional manner to build a package 30 of yarn having a desired amount of twist.

Referring to FIG. 2 it can be seen that the nozzle 36 is carried on the underside of the ring rail 16 by a bracket 54. The dashed lines show the nozzle 36 at the upper portion of the package 16 as the ring rail 14 is reciprocated progressively back and forth lengthwise of the package 30 (bobbin 24).

The exit end of the nozzle 36 faces the package 30 and releases or discharges a stream of heated air (indicated by dashed lines in FIG. 2) against the circumferential surface of the package 30. The stream impinges the package 30 in a zone along the length of the package 30. So only a portion of the circumferential surface of the package (outer layers) is subjected to drying influence of the stream of heated air at any one moment.

But movement of the stream (nozzle 36) effects progressive drying as the nozzle 36 is moved back and forth lengthwise of the package 30. So the moving stream is effective to progressively evaporate liquid from successive exterior layers of the package 30 during package formation.

The impinging stream of heated air increases the rate of evaporation of liquid from the outer layers of the package 30. The rate of evaporation is a function of temperature of the air, velocity of the air and the dryness of the air. So it is possible to control the rate of evaporation by controlling the temperature, moisture content and velocity of the air stream impinging against the exterior of the package 30.

It has been found that a boundary layer of air forms at the exterior surface of packages rotating at high speeds. So the energy of the stream must be sufficient to penetrate through the layer for effective drying. A stream that penetrates through the layer is able to directly contact the exterior of the package, thus promoting effective heat transfer and removal of the evaporated liquid.

In practice a package normally does not need to be "bone" dry. But when a liquid coating is used that contains particulate matter such as conventional sizings and coatings for glass strand, the particulates must be immobilized by the drying to obtain full benefit from such drying. Hence, in drying a wet strand package like package 30, sufficient moisture should be evaporated from its outer layers as they are formed to preclude movement of particulates within the wound package. So upon drying there should not be enough liquid left in the package to transport particulates.

It is also possible to dry materials which are rate or temperature sensitive by varying the velocity, humidity, and temperature relationships.

Since the nozzle 36 moves with the ring rail 16, the nozzle 36, which in the embodiment continually discharges a stream, is reciprocated lengthwise of the package 30 throughout package formation. Consequently, each layer is dried during package formation.

The nozzle 36 is shown in a preferred disposition discharging a stream against the circumferential surface of the package 30 in the zone of strand lay (indicated in FIG. 2) onto the package. This zone moves as the strand 14 is moved with the reciprocation of the ring rail 16.

In practice, a simple tube has been used for the nozzle 36 and has given good results when used on a conventional twister having a ring diameter of 5¾ inches. In such an arrangement air at from 135 to 190 degrees centigrade has been characteristically discharged from the tube nozzle. The velocity of the discharged air has been characteristically from 66–135 feet-per-second.

A variety of nozzles can be used. For example, nozzles for shaping streams in known ways can be used; other conventional nozzles can be used.

While good results can be obtained using heated air, it is possible to supply room temperature air to the nozzle 36. Other drying mediums or gases might be used.

It is possible to use a stream of gas having a gas component that reacts with an ingredient of a liquid coating applied to the strand. For example, if a resorcinol containing coating would be applied to a strand, a gaseous stream containing a mixture of formaldehyde and ammonia might be used to promote polymerization. Further, the gaseous stream might include a catalyst component. For example, if an epoxy containing coating would be applied to a strand, a gaseous stream containing an amine or polyamine might be used.

The reactive or catalytic components could be mixed with the gaseous stream in a variety of ways. For example, these gas components might be entrained in the heated air discharged from the nozzle 36. Also, separate nozzles might be used (see FIG. 7). One nozzle could discharge a reactive or catalytic gas stream to the same or another zone of the package.

The invention is shown in FIGS. 1 and 2 on a twister. But the invention has application whenever wet linear material is collected as layers. So in a broad sense the invention includes means effective to evaporate liquid from individual layers of wet linear material during its collection into layers. And such means for evaporating liquid includes means for subjecting individual layers to a stream of drying medium moved progressively across the layer.

FIG. 3 shows two positions of a twister embodying the principles of the invention. Except for the strand feeding arrangement, the twister is like the twister shown in FIGS. 1 and 2. Each of the positions include a pair of strand engaging feed rollers 110 and 112 for advancing wet strand 114 from driven rotatable wet serving packages 115 carried by a conventional support above the twisting station. The feed rollers 110 and 112 advance the strand 114 downwardly to a ring rail 116 and traveler 122 arrangement. A rotatably driven vertically oriented bobbin 124 collects the twisted strand into a wound package 130. Individual sizing applicators 132 apply liquid coating to the strand 112 along its path to twisting station. Individual nozzles 136 each direct a stream of drying gas against the circumferential surface at each of the packages 130 during package formation; the drying effect of the streams is explained in connection with the embodiment of the invention shown in FIGS. 1 and 2. Heated air under pressure is supplied to each of the nozzles 136 from a plenum 138 through flexible supply tubes 140.

FIGS. 4 and 5 show apparatus for forming continuous glass filaments from molten glass streams and collecting the glass filaments (gathered into a strand) as a wound package. The glass filaments are treated with liquid coating and combined into a wet untwisted filament bundle or strand. The strand is collected on a spindle or collet of a winder at a wound package.

The collection apparatus includes means for directing a stream of heated air against the outer circumferential surface of successive layers of the package throughout package formation and for effecting movement of the stream such that the individual layers are subjected to the drying influence of the stream progressively in a direction axially of the package to evaporate liquid from successive layers.

As illustrated a container 200 holds a supply of molten glass. The container 200, which is normally made of platinum or an alloy of platinum, can connect to a forehearth that supplies molten glass from a furnace or can connect to other means for supplying molten glass. For example, the container 200 can connect to a melter effective to reduce glass marbles to a heat-softened condition.

Electrical terminals 202 are at the ends of the container 200; these terminals connect to a source of electrical energy. When electrically energized through the terminals 202, the container 200 supplies heat by conventional resistance heating to molten glass held in it. The heat maintains the molten glass at proper fiber forming temperatures and viscosities.

The container 200 has a bottom wall 204 that has orifices or passageways for delivering individual streams 206 of molten glass from the container 200. In the embodiment shown the openings in the bottom wall 204 comprise rows of spaced apart depending orificed projections or tubular members 208.

Individual continuous glass filaments 210 withdrawn from the individual molten glass streams 206. The filaments 210 are combined into a strand 212 as they turn on a gathering shoe 214 located below the container 200.

Normally apparatus applies both water and a liquid sizing or other protective coating material to the traveling filaments 210. As shown a nozzle 220 adjacent to the bottom wall 204 directs water spray onto the continuous filaments 210 before the shoe 214 combines them into the glass strand 212.

An applicator 224 held within a housing 226 just above the gathering shoe 214 applies the liquid sizing or other coating material to the swiftly traveling continuous glass filaments 210. The applicator 224 can be any suitable type known to the art; however, the applicator 224 is shown as an endless belt moved through liquid held in the housing 226. As the continuous glass filaments 210 speed downwardly in touching relationship across the surface of the moving endless belt 224, some of the liquid on the belt transfers to them.

A winder 230 collects the strand 212 as a wound package 232 on a driven rotatable collector or collet 234. The package 232 is shown formed on a tube 236 telescoped onto the collet 234.

Advancement of the strand 212 downwardly to the package 232 during rotation of the collet 234 draws the continuous glass filaments 210 from the molten glass streams 206.

A traversing member 240 that is mounted for reciprocal motion on a support 242 of the winder 230 engages the strand 212. When reciprocated the member 240 moves the advancing strands 212 back and forth lengthwise of the package 232 during package formation.

The support 242 is an assembly that provides substantially infinite adjustment for the traversing member 240 and that includes a forward unit 244, a rearward unit 246 and a cam housing 248. The forward unit 244 and rearward unit 246 each moves about a separate axis spaced from the collet 234 and package 232. Reference letter A in FIG. 4 indicates the axis about which the rearward unit 246 moves. The forward unit 244 is mounted on the forward portion of the rearward unit 246 and moves about an axis indicated by the reference letter B in FIG. 4. The axes A and B are in spaced relation and extend in parallel directions lengthwise of the collet 234.

The cam housing 248 is a tubular member on the forward portion of the forward unit 244 and extends in a direction substantially parallel to the axis of rotation of the collet 234.

The traversing member 240 slidably mounts on the cam housing 248. A motor and drive arrangement within the winder 230 and support 242 reciprocates the traversing member 240 lengthwise of the collecting package 232. U.S. Pat. No. 3,717,448 discloses a winder like winder 230 and describes the operation of the motor and drive unit for reciprocating the traversing member 240.

The traversing member 240 engages the strand 212 along its path to the collet 234 and reciprocates the strand 212 back and forth lengthwise of the collet 234 to distribute the advancing strand 212 on the collet 234 (package 232). The motion given to the strand 212 is lateral of the strands direction of travel to the package 232 and is a combination of both rapidly reciprocating motion imparted to the strand by the traversing member 240 and slower reciprocating motion parted to the support 242.

The apparatus of FIGS. 4 and 5 includes means effective to evaporate liquid from successive layers of the package as they are formed. As shown there is a nozzle 250 that releases a stream of drying gas carried by the traversing member 240. Gas, e.g., air, superheated steam, etc., under pressure is supplied from a suitable source to the interior of the nozzle 250 through a flexible tube 252.

A bracket 254 joined to the underside of the member 240 holds the nozzle 250 so that the stream of air it releases is directed to impinge the circumferential surface in the region of strand lay onto the package. The nozzle 250 is reciprocated with the member 240. So the nozzle 250 (stream) is reciprocated with reciprocation of the strand 212. Accordingly, the nozzle 250 directs its stream in the zone of strand lay on the package throughout package formation. Evaporation is effected by the stream as dicussed in relation to the apparatus shown in FIGS. 1 and 2.

FIG. 6 is a plan view of a textile twister position that uses a plurality of adjacent nozzles 260 each discharging a stream of heat air against the circumferential surface of a collecting package 262 on a bobbin 264. The nozzles 260 are held on a ring rail 266 with a circular track 268 defining an opening 270. A traveler 272 freely moves on the track 268. As shown the nozzles 260 are carried by the ring rail 266 at the circumference of the opening 270. The nozzles 260 are reciprocated with the ring rail 266.

The streams of heated air from the nozzles 260 effect drying of the package 264 as explained in relation to the other embodiments of the invention. But in the apparatus of FIG. 6 the nozzles 260 each direct a drying stream to individual circumferentially spaced apart zones.

Figure 7:
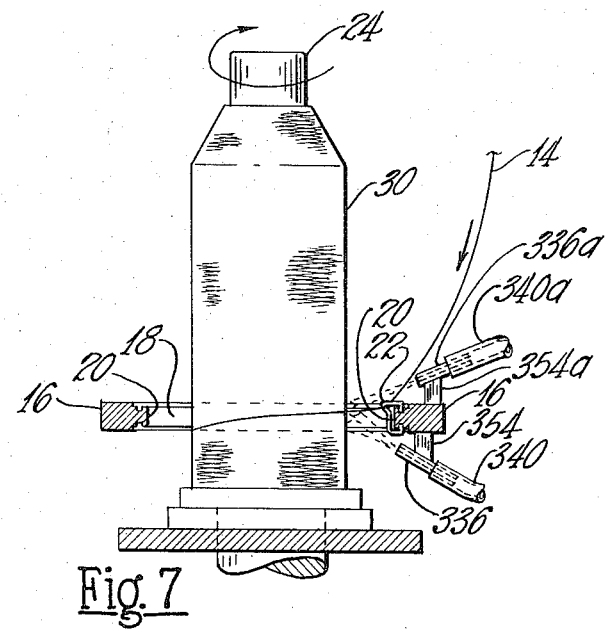
FIG. 7 is a view in elevation of the apparatus of FIG. 1 modified to include two nozzles each releasing a stream of drying gas that impinges against the exterior of the package in a common region.

FIG. 7 shows the apparatus of FIGS. 1 and 2 modified to include two stream discharging tubes, denoted by reference numbers 336 and 336a, each oriented to discharge a stream of gas (such as air) that impinges the package 30 in the same region. As illustrated the nozzles 336 and 336a are supplied heated air through flexible supply tubes 340 and 340a respectively. Brackets 354 and 354a hold the nozzles 336 and 336a on the ring rail 16. So both the nozzles are reciprocated with the ring rail 16.

In the embodiments shown each of the nozzles continuously releases a stream of gas, but the apparatus can be modified in known ways to have the nozzles intermittently or periodically release streams of gas.

Further, it is possible to dry a variety of different types of linear material. For example, it is possible to dry wet multifilament linear material such as nylon, polyester, etc. during collection. Further it is possible to collect linear material of discontinuous filaments besides continuous filament material. Also, the invention can be used with bulky or textured multifilament linear material.

I claim:

1. Twist frame apparatus for packaging linear material comprising:
   means for supplying wet linear material along a given path;
   a rotatable collector upon which the linear material is wound into successive layers as a package;
   means for rotating the collector;
   a ring rail having a circular opening for extension of the rotatable collector therethrough;
   a traveler through which the linear material is advanced along its path to the collector during package formation, the traveler being mounted for circular movement on the ring rail at the circumference of the circular opening;
   means for reciprocating the ring rail axially of the collector; and
   means effective to increase the rate of evaporation of liquid from successive outer layers of the wet linear material as the layers are being formed including a nozzle on the ring rail immediately adjacent the package for directing a stream of drying gas onto a portion of the outer circumferential surface of the package and means for supplying the gas under pressure to the interior of the nozzle, the nozzle being moved back and forth axially of the package with the ring rail as the ring rail is reciprocated to progressively subject the exterior of the package to the drying influence of the stream during package formation.

2. Apparatus of claim 1 further including means for applying liquid to the linear material as the material is advanced along the given path.

3. Apparatus of claim 2 in which the means for supplying the wet linear material includes a container holding linear material.

* * * * *